(12) United States Patent
Munemura et al.

(10) Patent No.: US 12,715,062 B2
(45) Date of Patent: Aug. 25, 2026

(54) FRICTION ELEMENT WELDING METHOD

(71) Applicant: JFE STEEL CORPORATION, Tokyo (JP)

(72) Inventors: Naoaki Munemura, Tokyo (JP); Koichi Taniguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 19/129,741

(22) PCT Filed: Nov. 21, 2023

(86) PCT No.: PCT/JP2023/041745
§ 371 (c)(1),
(2) Date: May 14, 2025

(87) PCT Pub. No.: WO2024/111571
PCT Pub. Date: May 30, 2024

(65) Prior Publication Data

US 2026/0183865 A1 Jul. 2, 2026

(30) Foreign Application Priority Data

Nov. 24, 2022 (JP) ................................ 2022-187280

(51) Int. Cl.
*B23K 20/12* (2006.01)
*B23K 20/24* (2006.01)
*B23K 103/04* (2006.01)

(52) U.S. Cl.
CPC .............. *B23K 20/24* (2013.01); *B23K 20/12* (2013.01); *B23K 20/1295* (2013.01); *B23K 2103/04* (2018.08)

(58) Field of Classification Search
CPC .......... B23K 20/24; B23K 20/12–1295; B23K 2103/04
(Continued)

(56) References Cited

U.S. PATENT DOCUMENTS

2013/0094896 A1 4/2013 Christ et al.
2020/0324363 A1* 10/2020 Abke .................. B23K 20/122
(Continued)

FOREIGN PATENT DOCUMENTS

CA 2212250 A1 * 3/1999 ............. B23K 2/121
CN 107160109 A * 9/2017 .............. B23P 15/00
(Continued)

OTHER PUBLICATIONS

May 7, 2024 Office Action issued in Japanese Patent Application No. 2024-508311.
(Continued)

*Primary Examiner* — Kiley S Stoner
(74) *Attorney, Agent, or Firm* — Oliff PLC

(57) ABSTRACT

An object is to provide a friction element welding method. A friction element welding method performs joining of a sheet assembly including two or more stacked metal sheets by pressing an element provided with a tip angle into the sheet assembly while rotating the element. The method includes an oxide film removal step of bringing the bottom surface of the element into contact with an oxide film on the top surface of the lowermost metal sheet in the sheet assembly, and removing the oxide film. The element used in the oxide film removal step is such that the elevation angle of the tip angle of the element satisfies a predetermined conditional expression depending on the element diameter, the pressurizing force, the rotational speed, and the tensile strength of the lowermost metal sheet.

10 Claims, 2 Drawing Sheets

(58) Field of Classification Search
USPC .............................. 228/112.1–114.5, 2.1–2.3
See application file for complete search history.

(56) References Cited

U.S. PATENT DOCUMENTS

| | | | | |
|---|---|---|---|---|
| 2024/0351133 | A1* | 10/2024 | Yamagishi | B23K 20/12 |
| 2025/0065438 | A1* | 2/2025 | Yamagishi | B23K 20/1225 |

FOREIGN PATENT DOCUMENTS

| | | | | | |
|---|---|---|---|---|---|
| CN | 110280887 | A | * | 9/2019 | B23P 19/02 |
| CN | 112157342 | A | * | 1/2021 | B23K 20/1235 |
| DE | 19620814 | A1 | | 11/1997 | |
| DE | 102018103991 | A1 | * | 8/2019 | B21J 13/03 |
| EP | 2689882 | A2 | * | 1/2014 | B29C 65/06 |
| EP | 3395548 | A1 | | 12/2016 | |
| EP | 4275828 | A1 | | 3/2022 | |
| JP | 2013-527804 | A | | 7/2013 | |
| JP | 2013534994 | A | | 9/2013 | |
| WO | 9744154 | A1 | | 11/1997 | |
| WO | WO-2008034563 | A1 | * | 3/2008 | B23K 35/0288 |
| WO | 2017110531 | A1 | | 6/2017 | |
| WO | 2022202631 | A1 | | 9/2022 | |

OTHER PUBLICATIONS

Dec. 8, 2025 Office Action issued in European Patent Application No. 23894576.0.

Jan. 16, 2024 Search Report issued in International Patent Application No. PCT/JP2023/041745.

Skovron, John D., et al. “Investigation of the Cleaning and Welding Steps From the Friction Element Welding Process”. ASME 2017, 12th International Manufacturing Sciences and Engineering Conference.

* cited by examiner

FRICTION ELEMENT WELDING METHOD

TECHNICAL FIELD

This application is a National Stage of International Application No. PCT/JP2023/041745 filed Nov. 21, 2023, which is based upon and claims benefit of priority from Japanese Patent Application No. JP2022-172109 filed Nov. 24, 2022, the entire contents of the prior application being incorporate herein by reference.

This application relates to a friction element welding method for joining a sheet assembly including at least two stacked metal sheets by friction element welding.

BACKGROUND

In recent years, the automotive industry has increasingly adopted high-strength steel sheets, known as ultrahigh-tensile steel sheets, in order to reduce the weight of vehicles and thereby reduce environmental loads and also to improve safety. This has led to an expectation for the development of steel sheets having higher strength and higher workability in the future. However, fusion welding, such as resistance spot welding, of steel sheets that are increased in strength and workability problematically gives weak joints due to the embrittlement of the solidification structure. For this reason, attention has been drawn to welding techniques capable of joining two or more steel sheets including a high-strength steel sheet without melting the steel sheets.

As described in Reference 1, an example of the non-melting welding techniques that are studied is FEW (Friction Element Welding) in which an element is pressed into a sheet assembly while being rotated at high speed to establish joining. For example, the element used in the friction element welding (FEW) has a structure disclosed in Patent Literature 1.

REFERENCE 1

Jamie D. Skovron, Brandt J. Ruszkiewicz, and Laine Mears, "INVESTIGATION OF THE CLEANING AND WELDING STEPS FROM THE FRICTION ELEMENT WELDING PROCESS", (ASME 2017 12th International Manufacturing Science and Engineering Conference collocated with the JSME/ASME 2017 6th International Conference on Materials and Processing, Jun. 4-8, 2017 Los Angeles, California, USA)

Patent Literature 1 discloses an element (corresponding to the "connecting element" in Patent Literature 1) in which the tip of a mandrel portion is substantially flat, and a pin-shaped centering part protrudes from the center of the flat tip. This structure of the element allows each connecting process to be performed on the connection site in a focused manner by the pin-shaped centering part, and ensures that the frictional energy that is applied is concentrated exclusively on the position of the penetrating element.

CITATION LIST

Patent Literature

PTL 1: Japanese Unexamined Patent Application Publication (Translation of PCT Application) No. 2013-527804

SUMMARY

Technical Problem

Patent Literature 1 only discloses that the tip of the mandrel portion of the element has a pin shape. In actual element welding, however, the shape of the element needs to be designed in accordance with welding conditions. Patent Literature 1 is silent with respect to such designing.

If a lower sheet that will form a joint with an element has residual oxide on its top surface, the oxide is mixed into the joint to destroy the soundness of the joint, thus causing a decrease in joint strength. For this reason, element welding requires that an oxide (specifically, an oxide film) should be removed from the top surface of a lower sheet that will form a joint with an element.

A possible approach to this problem is to use an element having the shape described in Patent Literature 1. However, it has been found that because the element of Patent Literature 1 has a narrow area of contact between the pin-shaped centering part at the lower part of the element and a sheet-shaped member, the contact between the centering part and the sheet-shaped member requires a long time to remove an oxide on the surface of the sheet-shaped member (namely, the top surface of the lower member).

Here, the "lower sheet that will form a joint with an element" indicates a lowermost metal sheet that is to be friction element welded with the tip of the element (that is, the lower part of the element) and is arranged at the bottom of the metal sheets that constitute a sheet assembly. The "top surface of a lower sheet" indicates a metal sheet surface of a lower sheet in a mating surface between the lower sheet and a metal sheet placed on top of the lower sheet.

This application aims to solve the problems discussed above. It is therefore an object of this application to provide a friction element welding method that can join a sheet assembly composed of two or more metal sheets by friction element welding in a way that an oxide on the top surface of a lower sheet that will form a joint with the element is removed quickly and a sound connection can be obtained.

Solution to Problem

In this application, extensive studies have been conducted to solve the above-described problems in friction element welding methods. A friction element welding method is a method of welding in which a sheet assembly including two or more stacked metal sheets is friction element welded by pressing an element into the sheet assembly while rotating the element at high speed.

The inventors have experimented with a friction element welding method using various elements with different tip shapes in a step of removing an oxide (an oxide film) on the top surface of a lower sheet. As a result, the inventors have found that the problems are effectively solved by appropriately changing the elevation angle of an element provided with a tip angle (hereinafter, the elevation angle will be also written as the "tip elevation angle") depending on the diameter of the element (hereinafter, also written as the "element diameter").

The finding will be explained in detail below. After an element has penetrated an upper sheet of a sheet assembly, the tip of the element rotating at high speed comes into contact with the top surface of a lower sheet of the sheet assembly. An oxide film present on the top surface of the lower sheet can be removed (here, this step will be written as the "oxide film removal step on the top surface of the lower sheet") quickly if the oxide film on the top surface of the lower sheet is smoothly expelled with the tip of the element. The area of an oxide film that needs to be expelled is larger with increasing diameter of the element. Here, an element should be used that has a tip elevation angle controlled to an appropriate range in accordance with the element diameter, the pressurizing force and the rotational speed during the oxide film removal step, and the tensile strength of the workpiece (namely, the metal sheet constituting the sheet assembly). The use of such an element can ensure an appropriate area of contact between the lower part of the element and the top surface of the lower sheet. Such appropriate control of the shape of the element tip depending on the welding conditions has been found effective in shortening the time required for the oxide film removal step on the top surface of the lower sheet.

As will be described later, the "tip elevation angle" of the element indicates the elevation angle ($\theta$) illustrated in FIG. 2, and the "element diameter" refers to the diameter (D) of the element illustrated in FIG. 2.

This disclosure has been made based on the findings discussed above. A gist of this application is as follows.

[1]A friction element welding method of joining a sheet assembly including two or more stacked metal sheets by pressing an element provided with a tip angle into the sheet assembly while rotating the element, the method including, before a step of starting frictional heat welding: an oxide film removal step of bringing a lower part of the element into contact with a top surface of a lowermost metal sheet arranged at the bottom of the sheet assembly, and removing an oxide film, the element used in the oxide film removal step being such that an elevation angle of a tip of the element satisfies:
expression (1) when $5.0>D\geq 3.0$,
expression (2) when $7.0>D\geq 5.0$, and
expression (3) when $D\geq 7.0$, $$(-0.016\times D+0.13)\times(P\times R/TS)\leq\theta\leq 60-D \quad (1)$$

$$(-0.004\times D+0.071)\times(P\times R/TS)\leq\theta\leq 60-D \quad (2)$$

$$(-0.0004\times D+0.045)\times(P\times R/TS)\leq\theta\leq 60-D \quad (3)$$

wherein D is an element diameter (mm), $\theta$ is the elevation angle (°), P is a pressurizing force (kN), R is a rotational speed (rpm), and TS is a tensile strength (MPa) of the lowermost metal sheet.

[2] The friction element welding method according to [1], wherein the rotational speed in the oxide film removal step is 500 rpm or more.

[3] The friction element welding method according to [1] or [2], wherein the pressurizing force in the oxide film removal step is 1 kN or more.

[4] The friction element welding method according to any one of [1] to [3], wherein any of the metal sheets is a steel sheet, and the tensile strength of the steel sheet is 590 MPa or more.

[5] The friction element welding method according to [1] or [2], wherein the tip of the element has a tapered shape consisting of a single cone.

Advantageous Effects

According to this application, the elevation angle ($\theta$) of the element tip is specified appropriately depending on the element diameter (D) and the welding conditions in the oxide film removal step so as to ensure an appropriate area of contact between the lower part of the element and the top surface of the lower sheet. In this manner, the oxide film removal step on the surface of the metal sheet to be joined (namely, the top surface of the lower sheet) can be completed in a short time without being affected by factors, such as the chemical composition of the metal sheets (the workpieces).

DESCRIPTION OF EMBODIMENTS

This application will be described below. It should be noted that this application is not limited to the embodiments below.

Figure 1:
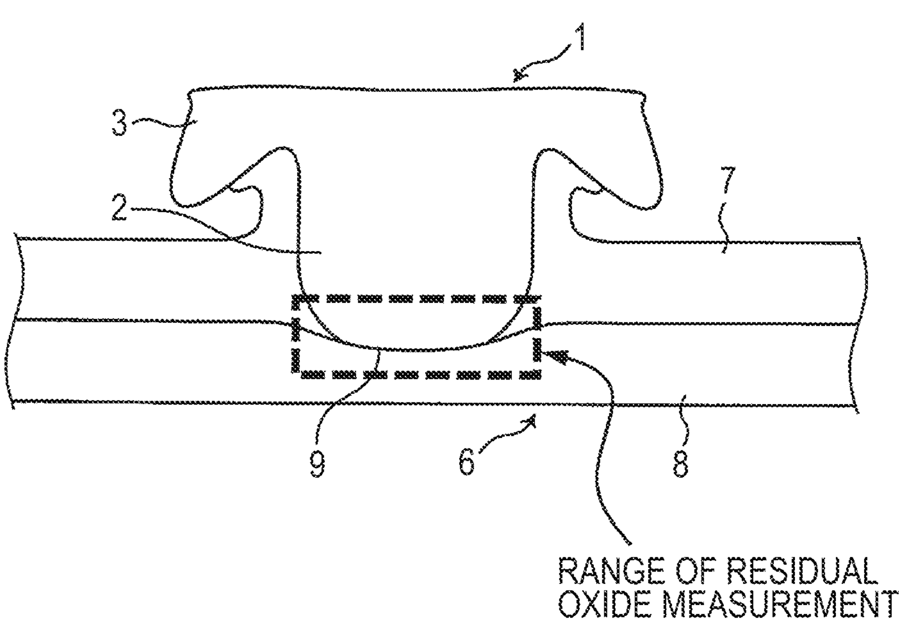
FIG. 1 is a schematic view illustrating an exemplary sheet assembly composed of two metal sheets that is joined by a friction element welding method of this application.
Figure 2:
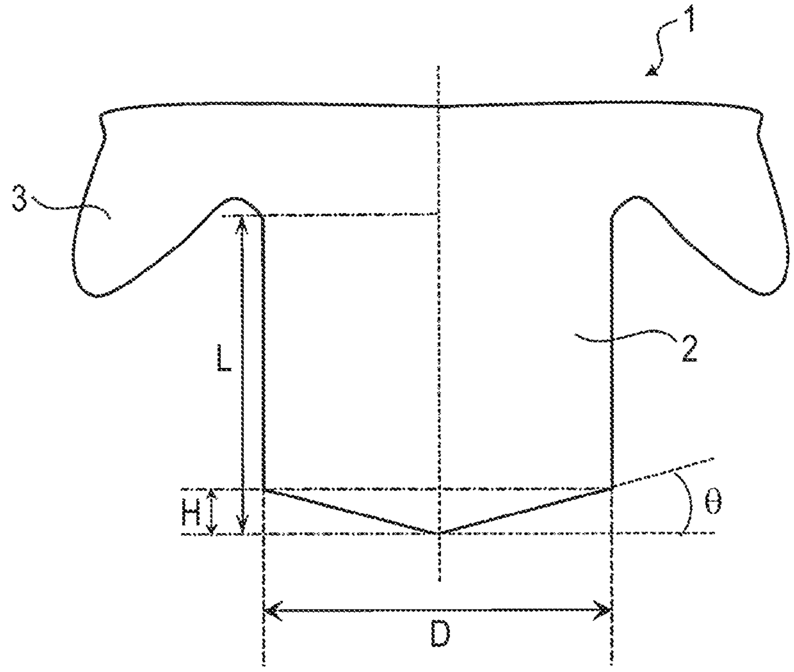
FIG. 2 is a sectional view illustrating an exemplary shape of an element used in a friction element welding method of this application.

First, a friction element welding method according to an embodiment of this application will be described with reference to FIGS. 1 and 2. FIG. 1 is a sectional view illustrating an exemplary sheet assembly consisting of two metal sheets that is joined by a friction element welding method of this application. FIG. 2 is a sectional view illustrating an exemplary shape of an element with a tip angle for use in the friction element welding method of this application.

In the friction element welding method (hereinafter, also written as the "welding method") of this application, an element provided with a tip angle is rotated and pressed into a sheet assembly including two or more stacked metal sheets, and thereby the sheet assembly is joined (see FIGS. 1 and 2). This joining is friction welding by frictional heat. The "sheet assembly including two or more stacked metal sheets" indicates a sheet assembly in which two or more metal sheets are stacked on top of one another.

While the following description will discuss friction element welding of two stacked metal sheets, this disclosure is applicable similarly to welding of three or more stacked metal sheets and can offer similar advantageous effects.

The welding method of this application includes at least, before a step of starting frictional heat welding, an oxide film removal step in which a lower part of an element is brought into contact with an oxide film on the top surface of a lowermost metal sheet (hereinafter, written as the "lower sheet") arranged at the bottom of a sheet assembly, and the oxide film is removed.

For example, the entire process of the welding method preferably includes a step of penetrating the element through an upper sheet, a step of removing an oxide film on the top surface of a lower sheet, a step of plastic deformation by frictional heat between the lower part of the element and the top surface of the lower sheet, and a step of compression. These steps will be described below.

Here, the "upper sheet" indicates an uppermost metal sheet that is placed at the top of the metal sheets (the workpieces) constituting the sheet assembly. The upper sheet and the lower sheet may be sheet-shaped members. The element includes a mandrel portion and a collar portion, and is provided with a tip angle at the tip of the mandrel portion (namely, the tip of the element) (see FIG. 2).

[Upper Sheet Penetration Step]

Although not shown in the figure, first, the stacked metal sheets (namely, the sheet assembly) are placed onto a support table of a welding device in such a way that the sheet assembly faces the element attached to the welding device. Next, the upper sheet penetration step is started. In this step, the rotational speed of the element is controlled with a control unit of the welding device, and the element being rotated is brought into contact with the upper sheet. Further, a pressurizing force is applied by the control unit to penetrate the element into the upper sheet. As a result, the upper sheet that is a sheet-shaped member is plasticized by frictional heat to allow the mandrel portion of the element to penetrate the upper sheet. The element finally penetrates through the upper sheet, and the lower part of the element comes into contact with the top surface of the lower sheet.

To apply the welding method of this application to joining of metal sheets including ultrahigh-tensile steel, which will be described later, it is preferable that the pressurizing force in this step be 3 to 6 kN and the rotational speed be 3000 to 7000 rpm. If the pressurizing force is less than 3 kN, there is a risk that the pressurizing force will not promote the penetration into the upper sheet. If, on the other hand, the pressurizing force is more than 6 kN, the element will be driven into the upper sheet while heating is still insufficient, causing a risk that the load on the welding device will be increased. If the rotational speed is less than 3000 rpm, there is a risk that plastic deformation will be inhibited due to insufficient heating. If, on the other hand, the rotational speed is more than 7000 rpm, the element may be deformed by excessive heating.

Next, the subsequent oxide film removal step is performed.

[Oxide Film Removal Step]

In the oxide film removal step, the tip of the rotating element (namely, the lower part of the element) is brought into contact with the top surface of the lower sheet to expel an oxide film present on the top surface of the lower sheet. The oxide film removal step on the top surface of the lower sheet is initiated by the element being rotated by the control unit of the welding device. This oxide film removal step ends when the control unit of the welding device detects that the drive-in position of the element has reached a predetermined depth (namely, a predetermined drive-in depth) and the removal of the oxide film is judged to have completed.

Here, the "drive-in depth" indicates the depth (mm) in which the element penetrates into the lower sheet in the thickness direction (that is, the distance in the thickness direction) starting from the position taken as 0 mm where the tip of the element comes into contact with the top surface of the lower sheet.

The "predetermined drive-in depth" is the depth (the drive-in depth) in the thickness direction at a position where the area of contact between the element and the lower sheet is equal to or greater than the sectional area of the mandrel portion of the element, and is determined in consideration of the deformation of the element by the pressurizing force applied during the driving.

In Examples described later, the "predetermined drive-in depth" is set to 0.8 mm based on the results of preliminary tests. The predetermined drive-in depth is put beforehand as the "preset drive-in depth" to a memory unit of the welding device. The control unit compares the drive-in depth actually obtained by the measurement to the preset drive-in depth stored in the memory unit, and detects whether the predetermined drive-in depth is reached. When the control unit detects that the predetermined drive-in depth has been reached, it is determined that the removal of the oxide film has been completed. The "drive-in depth" may be actually measured by, for example, detecting the position of a pressing cylinder with an optical sensor.

As mentioned earlier, an oxide remaining on the top surface of the lower sheet that will form a joint with the element will be mixed into the joint. In this application, it is important to prevent the entry of an oxide into the joint by removing the oxide film so that the amount of the oxide film remaining on the top surface of the lower sheet after the oxide film removal step will be equal to or less than a predetermined amount. In this manner, a sound joint can be formed and the joint strength can be enhanced.

In order to achieve the above effect, it is also important to appropriately specify a relationship between welding conditions during the oxide film removal step on the top surface of the lower sheet, and the element shape (specifically, the element diameter and the elevation angle of the element tip). The welding conditions include at least pressurizing force, rotational speed, and the tensile strength of the metal sheet. In this manner, the time (t) (unit: seconds) required from the start to the completion of oxide film removal can be shortened. Details are omitted here and will be described later.

Next, the subsequent plastic deformation step is performed.

[Plastic Deformation Step]

In the plastic deformation step, the element is driven into the lower sheet while being rotated at high speed under the application of a pressurizing force controlled by the control unit of the welding device. In this manner, the friction welding process is initiated. In the friction welding process, the tip of the element that has penetrated in the lower sheet generates frictional heat, which plastically deforms the lower sheet and the element. The tip of the mandrel portion of the element is connected to the lower sheet by friction element welding, and the material of the upper sheet that has been pushed out by plastic deformation comes into contact with the upper part of the element and is held down by the collar portion.

To apply the welding method of this application to joining of metal sheets including ultrahigh-tensile steel, which will be described later, it is preferable that the pressurizing force in this step be 3 to 6 kN and the rotational speed be 3000 to 7000 rpm. If the pressurizing force is less than 3 kN, there is a risk that the pressurizing force will not promote the penetration into the upper sheet. If, on the other hand, the pressurizing force is more than 6 kN, the element will be driven into the upper sheet while heating is still insufficient, causing a risk that the load on the welding device will be increased. If the rotational speed is less than 3000 rpm, there is a risk that plastic deformation will be inhibited due to insufficient heating. If, on the other hand, the rotational speed is more than 7000 rpm, the element may be deformed by excessive heating.

Next, the subsequent compression step is performed.

[Compression Step]

In the compression step, a mechanical joint is established between the element and the two or more metal sheets constituting the sheet assembly. In the final stage, the control unit of the welding device stops the rotation of the element and applies a pressurizing force to the element, and the material of the metal sheets that is pushed out by plastic deformation is pressure bonded to the element. The friction welding process is thus completed.

To apply the welding method of this application to joining of metal sheets including ultrahigh-tensile steel, which will be described later, it is preferable that the pressurizing force in this step be 8 to 9 kN. If the pressurizing force is less than 8 kN, there is a risk that the compression will be insufficient. If, on the other hand, the pressurizing force is more than 9 kN, the element may be deformed.

The process described above gives a sound connection between the element and the metal sheets constituting the sheet assembly, as illustrated in FIG. 1.

The upper sheet used in the welding method described above may be a metal sheet having a pilot hole (for example, a through hole). For example, such a pilot hole may be formed by a pre-holing process. In this case, the above-described step of penetrating the element into the upper sheet is omitted. That is, the stacked metal sheets (namely, the sheet assembly) are placed onto the support table of the welding device in such a way that the sheet assembly faces the element attached to the welding device, and the sheet assembly is subjected to the step of removing an oxide film on the top surface of the lower sheet, and the subsequent steps.

Next, the relationship in this disclosure between the welding conditions in the oxide film removal step and the element shape will be described in detail.

As already mentioned, smooth discharge of an oxide film is effective for shortening the time required for the oxide film removal step on the top surface of the lower sheet. As a result of extensive studies, the inventors have found that an appropriate area of contact between the lower part of the element and the top surface of the lower sheet can be ensured by (a) controlling the elevation angle of an element tip to an appropriate range in accordance with the element diameter, the pressurizing force and the rotational speed during the oxide film removal step, and the tensile strength of the metal sheet (the lower sheet), and (b) performing the oxide film removal step using an element having a tip elevation angle in the appropriate range.

The inventors have also found that the element designed as described above can remove an oxide film so that the amount of the oxide film remaining on the top surface of the lower sheet after the oxide film removal step will be equal to or less than a predetermined amount, thereby appropriately preventing the entry of the oxide into the joint.

Specifically, the element used in the oxide film removal step is such that the elevation angle of the tip of the element satisfies:

expression (1) when $5.0>D\geq3.0$,
expression (2) when $7.0>D\geq5.0$, and
expression (3) when $D\geq7.0$, $$(-0.016\times D+0.13)\times(P\times R/TS)\leq\theta\leq60-D \quad (1)$$

$$(-0.004\times D+0.071)\times(P\times R/TS)\leq\theta\leq60-D \quad (2)$$

$$(-0.0004\times D+0.045)\times(P\times R/TS)\leq\theta\leq60-D \quad (3)$$

wherein D is the element diameter (mm), θ is the elevation angle (°), P is the pressurizing force (kN) in the oxide film removal step, R is the rotational speed (rpm) in the oxide film removal step, and TS is the tensile strength (MPa) of the lowermost metal sheet (the lower sheet).

An important feature of this application is that the element that has a shape satisfying the conditional expressions (1) to (3) is used in the oxide film removal step. The reasons for this will be described below.

The oxide film can be expelled more effectively and the welded joint that is obtained has higher joint strength with increasing area of contact between the lower part of the element and the top surface of the lower sheet. Thus, it will be effective to ensure an area of contact between the lower part of the element and the top surface of the lower sheet by increasing the element diameter (D) and approximating the element tip to flat. When, on the other hand, the element has a small element diameter (D), increasing the area of contact between the lower part of the element and the top surface of the lower sheet increases the thermal effect by heat input on the element. As a result, the welded joint that is obtained has a low joint strength. For this reason, this application adopts a gradual change in the elevation angle (θ) of the element tip depending on the element diameter (D), and specifies the above conditional expressions so that the area of contact between the lower part of the element and the top surface of the lower sheet will be optimized.

Specifically, when the element diameter (D) is $5.0>D\geq3.0$, conditional expression (1) is thus specified so that the elevation angle (θ) of the element tip will be larger with decreasing element diameter (D). If the elevation angle (θ) of the element tip fails to satisfy conditional expression (1), the lower part of the element has a narrow area of contact with the surface of the lower sheet and cannot remove the oxide film effectively. As mentioned above, an element having a small element diameter (D) is significantly thermally affected by heat input when a contact area is ensured. Furthermore, a small element diameter means a small joint diameter and thus leads to a risk that sufficient joint strength cannot be obtained. For these reasons, the element diameter (D) of interest in this application is 3.0 mm or more.

When the element diameter (D) is $7.0>D\geq5.0$, the thermal influence is less because the element diameter (D) in conditional expression (2) is larger than the element diameter (D) in conditional expression (1). In view of this, conditional expression (2) is thus specified so that the change in the elevation angle (θ) of the element tip will be more gradual than in conditional expression (1). If the elevation angle (θ) of the element tip fails to satisfy conditional expression (2), the lower part of the element has a narrow area of contact with the surface of the lower sheet and cannot remove the oxide film effectively.

Furthermore, when the element diameter (D) is $D\geq7.0$, the largeness of the element diameter (D) in conditional expression (3) compared to those in conditional expressions (1) and (2) reduces the thermal influence even when the elevation angle (θ) of the element tip is small, and allows a contact area to be ensured. For this reason, conditional expression (3) is thus specified so that the elevation angle (θ) of the element tip angle will be smaller with increasing element diameter (D). If the elevation angle (θ) of the element tip fails to satisfy conditional expression (3), the lower part of the element has a narrow area of contact with the surface of the lower sheet and cannot remove the oxide film on the joining surface effectively.

The upper limit of the element diameter (D) applied to conditional expression (3) is not particularly specified. It is, however, preferable that the element diameter (D) be 9.0 mm or less. The reason for this is as follows. An element having an element diameter (D) of more than 9.0 mm requires a large torque for the rotation and penetration of the element, and the size of the device configuration that is required will be also large. That is, practicality is impaired from the point of view of the automobile assembling process.

In addition to the conditional expressions described above, the oxide film removal step in this application may further involve welding conditions specified below for the purpose of further promoting the discharge of the oxide film.

[Rotational Speed R] (Preferred Condition)

The rotational speed R during the oxide film removal step is preferably 500 rpm or more. The reason for this is because rotations at a rotational speed R of 500 rpm or more promote plastic deformation by frictional heat and also accelerate the removal of the oxide film. The rotational speed R is more preferably 5000 rpm or more. The upper limit of the rotational speed R is not particularly specified. To prevent a decrease in element strength due to excessive heating, the rotational speed R is preferably 9000 rpm or less, and more preferably 8000 rpm or less.

[Pressurizing Force P] (Preferred Condition)

The pressurizing force P during the oxide film removal step is preferably 1 kN or more. The reason for this is because a pressurizing force P of 1 kN or more promotes plastic deformation of the lower sheet and also accelerates the removal of the oxide film. The pressurizing force (P) is more preferably 3 kN or more, and still more preferably 7 kN or more. The upper limit of the pressurizing force (P) is not particularly specified. From the point of view of element strength, the pressurizing force (P) is preferably 10 kN or less, and more preferably 9 kN or less.

In the oxide film removal step in this application, it is preferable that the time (t) required from the start to the completion of removing the oxide film on the top surface of the lowermost metal sheet (the top surface of the lower sheet) be 5 seconds or less. The reason for this is as follows. If the required time is more than 5 seconds, the element becomes hot due to the frictional heat, and consequently the umbrella portion of the element is thermally deformed to make it impossible to obtain sufficient joint strength. The lower limit of the required time is not particularly specified. From the point of view of shortening the time of the welding process, it is preferable that the required time be 1 second or less.

In the oxide film removal step in this application, it is preferable that the oxide film survival ratio on the top surface of the lowermost metal sheet be less than 20%. The reason for this is as follows. If the oxide film survival ratio is 20% or more, the area of the joint between the element and the lower sheet is reduced and consequently the joint strength may be lowered. The lower limit of the oxide film survival ratio is not particularly specified.

Figure 3:
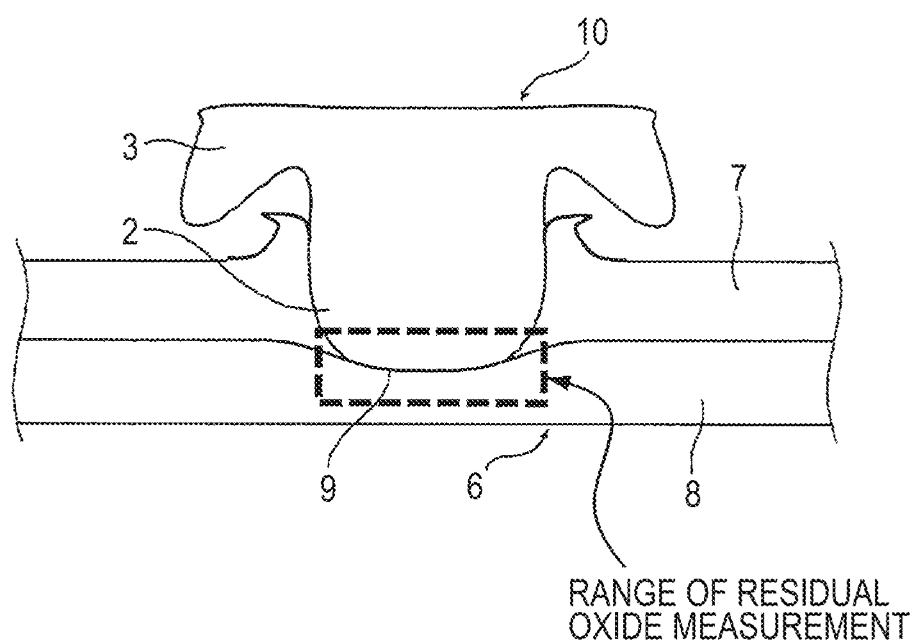
FIG. 3 is a schematic view illustrating an exemplary connection using a conventional element.

Here, the "oxide film survival ratio" indicates the proportion of the oxide remaining on the top surface of the metal sheet (here, the top surface of the lower sheet) at the interface between the element and the metal sheet after the oxide film removal step, as illustrated in FIGS. 1 and 3. The oxide film survival ratio may be measured by the method described later in Examples.

Next, an embodiment of the element used in the welding method of this application will be described with reference to FIG. 2.

FIG. 2 is a longitudinal sectional view through the center of an element 1. As illustrated in FIG. 2, the element 1 used in this application has a mandrel portion 2 and a collar portion 3.

As illustrated in FIG. 1, the element 1 is a tool that is rotated and pressed into a sheet assembly including two or more stacked metal sheets to friction weld the sheet assembly with the element 1.

The mandrel portion 2 is provided along the axis of the element 1 and has a cylindrical shape except the tip. The diameter (mm) of the cylinder is the element diameter (D). The tip of the mandrel portion (namely, the element tip) is angled so that the tip portion protrudes, thus forming a single cone. As illustrated in the sectional view of FIG. 2, the side of this cone is tapered. Specifically, as illustrated in FIG. 2, the line extending between the ends of the cylindrical shape through the element axis is tapered. There is no flat region at the tip of the mandrel portion. That is, the cross section of the cone is linear, and there is no flat region that is parallel to a straight line perpendicular to the element axis. The reason for this is described below. If a flat region is present, a sufficient difference is not produced in pressure that pushes out the oxide film, between the center of the mandrel portion and the outer periphery of the mandrel portion, and consequently the element may fail to expel the oxide film sufficiently.

In this application, the angle (namely, the taper angle) (°) between a straight line perpendicular to the axis of the element 1 at the tip of the protrudent mandrel portion and the side surface of the cone (namely, the tapered surface) is defined as the elevation angle (θ).

The total length L (mm) of the mandrel portion 2 is equal to or less than the sum of the thicknesses of all the metal sheets constituting the sheet assembly 6. The total length L of the mandrel portion 2 may be adjusted to a length that allows the tip of the mandrel portion 2 to be joined to the lower sheet 8. The total length L is preferably 3 to 6 mm.

The collar portion 3 is provided on the mandrel portion 2, that is, at the head of the element 1. As illustrated in FIG. 2, the shape of the collar portion 3 may be, for example, a wafer, a truss, or the like. The collar portion 3 may have any shape that can hold back the material of the upper sheet 7 that is pushed out by plastic flow.

The letter "H" in FIG. 2 indicates the distance from the tip top of the mandrel portion to the position leading from the cut in the direction perpendicular to the central axis of the mandrel. Incidentally, H is equal to or less than the total length L of the mandrel portion 2 and satisfies $H<L$.

Specifically, the element 1 used in this application is formed into such a shape that the elevation angle (θ) of the element tip falls within a numerical range derived from the above-described conditional expression consisting of the element diameter (D), the pressurizing force P and the rotational speed R during the oxide film removal step, and the TS of the metal sheet (the workpiece). This ensures that the oxide film on the top surface of the lower sheet can be easily expelled from the joint interface, and the oxide film removal step can be shortened in time. Even when the step is shortened in time, the joining with the element 1 of this application can ensure a sound connection compared to joining with the conventional element, such as one disclosed in Patent Literature 1.

Next, the connection of a welded joint obtained by the welding method of this application will be described with reference to FIGS. 1 and 3.

FIG. 1 illustrates an exemplary sheet assembly consisting of two metal sheets that is joined using an element 1 provided with a tip angle according to this application. FIG. 3 illustrates a conventional example of a sheet assembly consisting of two metal sheets that is joined using a conventional element 10. In both FIGS. 1 and 3, the welding method of this application described hereinabove is used as the welding method. FIGS. 1 and 3 are through-thickness sectional views of the obtained welded joints cut through the center of the element.

When a sheet assembly 6 composed of two metal sheets (an upper sheet 7 and a lower sheet 8 in FIG. 3) is joined by the welding method of this application using a conventional element 10, the element 10 forms a joint illustrated in the conventional example of FIG. 3. As illustrated in FIG. 3, the element 10 achieves joining of the upper sheet 7 and the lower sheet 8 but has a gap between the material of the upper sheet 7 that has been plastically deformed and pushed out during the welding process, and a collar portion 3 provided on a mandrel portion.

Here, the "conventional element" used above has a cone shape at the tip of the mandrel portion but, unlike this application, the angle is not specified in accordance with the element diameter and the welding conditions.

The inventors believe that this gap stems from the step of removing an oxide film on the surface of the lower sheet in the friction element welding method. Observation was made on a cross section of a joint portion of a welded joint obtained with insufficient discharge of an oxide film on the top surface of a lower sheet in the oxide film removal step. The observation confirmed a residual oxide from the oxide film on the top surface of the lower sheet, at the joint interface between the element 10 and the lower sheet 8. As a result, the connection was unsound. This unsoundness was ascribed to the insufficient time of the oxide film removal step and the insufficient discharge of the oxide film. Another reason was probably because the inappropriate design of the element shape failed to ensure a sufficient area of contact between the element and the top surface of the lower sheet and did not promote the removal of the oxide film.

When, in contrast, a sheet assembly 6 composed of two metal sheets (an upper sheet 7 and a lower sheet 8 in FIG. 1) is joined by the welding method of this application using the element 1 of this application (see FIG. 2), the element 1 forms a joint illustrated in FIG. 1. Specifically, the sheet assembly 6 consisting of two sheet-shaped members (the upper sheet 7 and the lower sheet 8) is joined in such a manner that the tip of the mandrel 2 is connected to the lower sheet 8 by friction element welding, and the material of the upper sheet 7 that has been plastically deformed and pushed out by the welding process is held down by the collar portion 3 provided on the top of the mandrel. The metal sheets 7, 8 and the element 1 are thus joined together.

As illustrated in FIG. 1, an observation of a cross section of the joint portion around the element 1 of this application confirmed that the connection was sound. That is, it has been shown that the welding method using the element 1 provided with a tip angle according to this application can significantly reduce the proportion of residual oxide after the oxide film removal step, unlike the case where the conventional element 10 illustrated in FIG. 3 is used.

In this application, steel sheets may be used as the metal sheets (the workpieces) that constitute a sheet assembly. In this case, two or more metal sheets including at least one steel sheet may be stacked together to form a sheet assembly. For example, an aluminum alloy sheet and a steel sheet may be stacked to form a sheet assembly, or, for example, steel sheets may be stacked to form a sheet assembly. When an aluminum alloy sheet and a steel sheet are combined as a sheet assembly, the aluminum alloy sheet may be used as the upper sheet or the lower sheet.

As is the case in the example illustrated in FIG. 1, this application may employ metal sheets including ultrahigh-tensile steel as the upper sheet 7 and the lower sheet 8. In this application, the term "ultrahigh-tensile" means that the steel sheets have a tensile strength (TS) of 980 MPa or more, and the term "high-tensile" indicates that the steel sheets have a tensile strength (TS) of 590 MPa or more and less than 980 MPa. It is preferable that the tensile strength of the lower sheet be 590 MPa or more.

EXAMPLES

Examples of this application are described below to further facilitate the understanding of this application. Examples below do not limit the scope of this application, and any modifications or the like that satisfy the gist of this application fall within the technical scope of this application.

Metal sheets described as upper sheets and lower sheets in Table 1 were used as test materials and were stacked to form sheet assemblies. The upper sheet in the sheet assembly A had a pre-hole 7 mm in diameter Φ.

Among the steps described hereinabove, the oxide film removal step alone was performed in this Example and evaluations were made as described below. In the oxide film removal step, the pressurizing force and the rotational speed were controlled as described in Table 2. As already mentioned, the drive-in depth here was set to 0.8 mm. The elements used for welding had a shape defined by an element diameter (D) and an element elevation angle (θ) described in Table 2. The tip removal height was set to 0. This "tip removal height" refers to the height of the taper start point (see FIG. 2).

The reduction in time of the oxide film removal step of this application was evaluated as follows.

[Evaluation of Reduction in Time]

In this Example, the time required for the oxide film removal step of this application is shown in "Time t (seconds) required to complete the oxide film removal step" in Table 2. Specifically, the "required time (t)" is the amount of time required from the start to the completion of the removal of an oxide film in the oxide film removal step. The removal in the oxide film removal step was judged to "start" when the tip of the element came into contact with the top surface of the lower sheet. The removal in the oxide film removal step was judged to be "complete" when the tip of the element reached the drive-in depth described above. In this Example, the upper limit of the time required for the oxide film removal step was set to 5 seconds.

Here, the rating was "A" when the required time (t) was 0 seconds or more and less than 2 seconds, "B" when the required time (t) was 2 seconds or more and less than 3 seconds, and "C" when the required time (t) was 3 seconds or more. The rating was "F" when the oxide film removal step was not completed within the upper limit time (within 5 seconds). The ratings "A", "B", and "C" were acceptable, with "A" being best. The rating "F" was worst and was rejected. The evaluation results obtained are described in Table 2.

Furthermore, the lower sheets after the oxide film removal step were analyzed as described below to observe the distribution of the oxide film remaining on the top surface of the lower sheet, and were subsequently evaluated according to the criteria described later.

[Observation of the Distribution of the Oxide Film]

The distribution of the oxide film was observed immediately after the completion of the oxide film removal step of this application. The lower sheets after the oxide film removal step were used for the distribution observation. The distribution of the oxide remaining on the surface of the steel sheet (the top surface of the lower sheet) at the interface between the element and the steel sheet was observed using EPMA (Electron Probe Micro Analyzer). The region that was observed was the range of residual oxide measurement shown in a rectangular frame in FIG. 1. Specifically, the range of measurement was a region that included the interface between the lower part of the element and the lower sheet and corresponded to the element diameter (D) in the width direction.

Five fields of view were appropriately selected at equal distances on each of the left and the right of the element axis, and the amounts of the oxide measured in these ten fields of view were averaged. The average was taken as the amount of the oxide after the oxide film removal step. Separately, the amount of the oxide on the surface of the lower sheet before the oxide film removal step was determined by observing the cross section of the lower sheet with EPMA. The distribution ratio x (%) of the amount of the oxide after the oxide film removal step relative to the amount of the oxide on the surface of the lower sheet before the oxide film removal step was calculated. The distribution ratio x was taken as the "oxide film survival ratio (%)."

Here, the rating was "A" when the distribution ratio x of the residual oxide was less than 10%, "B" when the distribution ratio x was 10% or more and less than 20%, "C" when the distribution ratio x was 20% or more and less than 30%, and "F" when the distribution ratio x was 30% or more. The ratings "A" and "B" were acceptable (sound connection), with "A" being best. The ratings "C" and "F" were rejected, with "F" being worst. The "sound connection" means that the distribution of the residual oxide was significantly reduced as described above. The evaluation results obtained are described in Table 2.

TABLE 1

| | Upper sheet | | | Lower sheet | | |
|---|---|---|---|---|---|---|
| Sheet assemblies | Tensile strength (MPa) | Metal sheet | Thickness (mm) | Tensile strength (MPa) | Metal sheet | Thickness (mm) |
| A | 1470 | Ultrahigh-tensile steel | 1.6 | 1470 | Ultrahigh-tensile steel | 1.6 |
| B | 1470 | Ultrahigh-tensile steel | 1.0 | 1470 | Ultrahigh-tensile steel | 1.6 |
| C | 270 | Aluminum alloy | 1.6 | 1470 | Ultrahigh-tensile steel | 1.6 |
| D | 590 | High-tensile steel | 1.6 | 980 | Ultrahigh-tensile steel | 1.6 |

TABLE 2

| No. | Sheet assemblies | Element diameter D (mm) | Elevation angle θ of element tip (°) | Pressurizing force P in oxide removal step (kN) | Rotational speed R in oxide removal step (rpm) | Tensile strength TS of lower sheet (MPa) | Conditional expression *1 Exp. | Conditional expression *1 Result | Time required to complete oxide removal step | Proportion of residual oxide distributed at tool-steel sheet interface after welding | Remarks |
|---|---|---|---|---|---|---|---|---|---|---|---|
| 2 | A | 3.00 | 60 | 7 | 6500 | 1470 | Exp. (1) | × | B | C | Comp. Ex. |
| 3 | A | 3.20 | 54 | 7 | 6500 | 1470 | Exp. (1) | ○ | B | B | Inv. Ex. |
| 4 | A | 9.00 | 55 | 7 | 6500 | 1470 | Exp. (3) | × | F | B | Comp. Ex. |
| 5 | A | 9.20 | 50 | 7 | 6500 | 1470 | Exp. (3) | ○ | C | B | Inv. Ex. |
| 6 | A | 8.90 | 50 | 7 | 6500 | 1470 | Exp. (3) | ○ | B | B | Inv. Ex. |
| 8 | A | 3.20 | 2 | 7 | 6500 | 1470 | Exp. (1) | × | B | F | Comp. Ex. |
| 9 | A | 3.10 | 5 | 7 | 6500 | 1470 | Exp. (1) | ○ | B | B | Inv. Ex. |
| 10 | A | 9.00 | 1 | 7 | 6500 | 1470 | Exp. (3) | × | F | B | Comp. Ex. |
| 11 | A | 9.30 | 2 | 7 | 6500 | 1470 | Exp. (3) | ○ | C | B | Inv. Ex. |
| 12 | A | 9.00 | 3 | 7 | 6500 | 1470 | Exp. (3) | ○ | B | B | Inv. Ex. |
| 13 | A | 4.55 | 20 | 7 | 6500 | 1470 | Exp. (1) | ○ | A | A | Inv. Ex. |
| 14 | A | 5.50 | 20 | 7 | 6500 | 1470 | Exp. (2) | ○ | A | A | Inv. Ex. |
| 15 | A | 6.00 | 15 | 7 | 6500 | 1470 | Exp. (2) | ○ | B | A | Inv. Ex. |
| 16 | A | 5.00 | 18 | 10 | 9000 | 1470 | Exp. (2) | ○ | B | B | Inv. Ex. |
| 17 | A | 4.90 | 24 | 10 | 9000 | 1470 | Exp. (1) | ○ | B | B | Inv. Ex. |
| 18 | B | 4.50 | 23 | 3 | 5000 | 1470 | Exp. (1) | ○ | A | B | Inv. Ex. |
| 19 | B | 6.00 | 21 | 3 | 5000 | 1470 | Exp. (2) | ○ | B | B | Inv. Ex. |
| 20 | D | 4.55 | 20 | 7 | 6500 | 980 | Exp. (1) | ○ | A | A | Inv. Ex. |
| 21 | D | 5.00 | 22 | 10 | 9000 | 980 | Exp. (2) | ○ | B | B | Inv. Ex. |
| 22 | C | 4.55 | 20 | 8.5 | 5000 | 1470 | Exp. (1) | ○ | B | A | Inv. Ex. |

TABLE 2-continued

| No. | Sheet assemblies | Element diameter D (mm) | Elevation angle θ of element tip (°) | Pressurizing force P in oxide removal step (kN) | Rotational speed R in oxide removal step (rpm) | Tensile strength TS of lower sheet (MPa) | Conditional expression *1 Exp. | Result | Time required to complete oxide removal step | Proportion of residual oxide distributed at tool-steel sheet interface after welding | Remarks |
|---|---|---|---|---|---|---|---|---|---|---|---|
| 23 | C | 4.55 | 20 | 8.5 | 9000 | 1470 | Exp. (1) | ○ | A | B | Inv. Ex. |
| 24 | D | 4.55 | 40 | 7 | 500 | 590 | Exp. (1) | ○ | A | A | Inv. Ex. |
| 25 | A | 4.55 | 20 | 7 | 8000 | 1470 | Exp. (1) | ○ | A | A | Inv. Ex. |
| 26 | A | 5.00 | 60 | 7 | 6500 | 1470 | Exp. (2) | × | B | F | Comp. Ex |

*1. Exp. (1): $(-0.016 \times D + 0.13) \times (P \times R/TS) \leq \theta \leq 60 - D$ Exp. (2): $(-0.004 \times D + 0.071) \times (P \times R/TS) \leq \theta \leq 60 - D$ Exp. (3): $(-0.0004 \times D + 0.045) \times (P \times R/TS) \leq \theta \leq 60 - D$ In Nos. 2, 4, 8, 10, and 26 described in Table 2, the elevation angle (θ) of the element tip used for the welding did not satisfy the conditional expression applied in accordance with the element diameter (D). As a result, the lower part of the element had a narrow area of contact with the surface of the lower sheet and failed to remove the oxide film on the joining surface effectively.

REFERENCE SIGNS LIST

1, 10 ELEMENT
2 MANDREL PORTION
3 COLLAR PORTION
6 SHEET ASSEMBLY
7 UPPER SHEET
8 LOWER SHEET
9 ELEMENT-LOWER SHEET JOINT INTERFACE

The invention claimed is:

1. A friction element welding method of joining a sheet assembly including two or more stacked metal sheets by pressing an element provided with a tip angle into the sheet assembly while rotating the element, the method comprising, before a step of starting frictional heat welding:

an oxide film removal step of bringing a lower part of the element into contact with a top surface of a lowermost metal sheet arranged at the bottom of the sheet assembly, and removing an oxide film, the element used in the oxide film removal step being such that an elevation angle of a tip of the element satisfies:

expression (1) when 5.0>D≥3.0, expression (2) when 7.0>D≥5.0, and expression (3) when D≥7.0, $$(-0.016 \times D+0.13) \times (P \times R/TS) \leq \theta \leq 60-D \quad (1)$$

$$(-0.004 \times D+0.071) \times (P \times R/TS) \leq \theta \leq 60-D \quad (2)$$

$$(-0.0004 \times D+0.045) \times (P \times R/TS) \leq \theta \leq 60-D \quad (3)$$

wherein D is an element diameter (mm), θ is the elevation angle (°), P is a pressurizing force (kN), R is a rotational speed (rpm), and TS is a tensile strength (MPa) of the lowermost metal sheet.

2. The friction element welding method according to claim 1, wherein the rotational speed in the oxide film removal step is 500 rpm or more.

3. The friction element welding method according to claim 1, wherein the pressurizing force in the oxide film removal step is 1 kN or more.

4. The friction element welding method according to claim 2, wherein the pressurizing force in the oxide film removal step is 1 kN or more.

5. The friction element welding method according to claim 1, wherein any of the metal sheets is a steel sheet, and the tensile strength of the steel sheet is 590 MPa or more.

6. The friction element welding method according to claim 2, wherein any of the metal sheets is a steel sheet, and the tensile strength of the steel sheet is 590 MPa or more.

7. The friction element welding method according to claim 3, wherein any of the metal sheets is a steel sheet, and the tensile strength of the steel sheet is 590 MPa or more.

8. The friction element welding method according to claim 4, wherein any of the metal sheets is a steel sheet, and the tensile strength of the steel sheet is 590 MPa or more.

9. The friction element welding method according to claim 1, wherein the tip of the element has a tapered shape consisting of a single cone.

10. The friction element welding method according to claim 2, wherein the tip of the element has a tapered shape consisting of a single cone.

* * * * *